(12) United States Patent  
Gilbert et al.

(10) Patent No.: US 8,553,323 B2  
(45) Date of Patent: Oct. 8, 2013

(54) OBJECTIVE CHANGER

(71) Applicant: Leica Microsystems CMS GmbH, Wetzlar (DE)

(72) Inventors: Manfred Gilbert, Schoeffengrund (DE); Gerhard Pfeifer, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 13/852,152

(22) Filed: Mar. 28, 2013

(65) Prior Publication Data

US 2013/0222898 A1 Aug. 29, 2013

Related U.S. Application Data

(63) Continuation of application No. 12/797,388, filed on Jun. 9, 2010, now abandoned.

(30) Foreign Application Priority Data

Jun. 16, 2009 (DE) .......................... 10 2009 026 978  
Sep. 2, 2009 (DE) .......................... 10 2009 029 146

(51) Int. Cl.  
    *G02B 21/02* (2006.01)
(52) U.S. Cl.  
    USPC ........................................ 359/381; 359/821
(58) Field of Classification Search  
    USPC ................................................ 359/381, 821  
    See application file for complete search history.

(56) References Cited

U.S. PATENT DOCUMENTS

| 3,930,712 | A | | 1/1976 | Boughton et al. |
| 5,576,897 | A | * | 11/1996 | Kuo .............................. 359/822 |
| 5,818,637 | A | * | 10/1998 | Hoover et al. ................ 359/381 |
| 6,094,299 | A | * | 7/2000 | Schau et al. .................. 359/383 |
| 6,236,503 | B1 | | 5/2001 | Kaczynski et al. |
| 6,268,958 | B1 | * | 7/2001 | Furuhashi ..................... 359/381 |
| 6,359,731 | B1 | * | 3/2002 | Koyama ........................ 359/381 |

(Continued)

FOREIGN PATENT DOCUMENTS

| DE | 1118603 A | 11/1961 |
| DE | 19822870 C2 | 11/1999 |

(Continued)

*Primary Examiner* — Mark Consilvio  
(74) *Attorney, Agent, or Firm* — Leydig, Voit & Mayer, Ltd.

(57) ABSTRACT

A microscope objective changer includes a changing device for changing at least two objectives. A movable objective holder corresponds to each objective. Each movable objective holder is configured to receive a respective one of the objectives and to transfer the respective objective along a respective displacement path from an allocated stand-by position into an operating position. A carrier is associated with each objective holder and includes a guide groove constituting the respective displacement path. Each displacement path includes a first portion beginning at the respective stand-by position and extends substantially perpendicular to the optical axis and a second portion directly bordering the first portion that includes a downwardly component in a direction parallel to the optical axis such that each objective holder is movable from the respective stand-by position to the optical axis of the operating position when reaching a lower end of the second portion of the displacement path.

17 Claims, 15 Drawing Sheets

(56) References Cited

U.S. PATENT DOCUMENTS

| | | | |
|---|---|---|---|
| 6,400,501 B2* | 6/2002 | Tsuchiya et al. | 359/380 |
| 6,437,911 B1* | 8/2002 | Hasegawa | 359/381 |
| 7,327,514 B2* | 2/2008 | Uhl et al. | 359/381 |
| 8,213,081 B2 | 7/2012 | Lippert et al. | |
| 2002/0001126 A1* | 1/2002 | Engelhardt | 359/380 |
| 2007/0047075 A1* | 3/2007 | Wahl et al. | 359/381 |
| 2010/0103510 A1* | 4/2010 | Kimura | 359/381 |
| 2010/0309546 A1* | 12/2010 | Seifert | 359/381 |
| 2010/0315707 A1* | 12/2010 | Gilbert et al. | 359/381 |

FOREIGN PATENT DOCUMENTS

| | | | |
|---|---|---|---|
| DE | 102005040834 A1 | | 3/2007 |
| DE | 102007018862 A1 | | 10/2008 |
| DE | 102007029402 A1 | * | 1/2009 |
| DE | 102007042260 A1 | | 3/2009 |
| DE | 102007058341 A1 | | 6/2009 |
| EP | 1168027 B1 | | 1/2002 |
| JP | 09258088 A | | 10/1997 |
| JP | 2001091853 A | * | 4/2001 |

* cited by examiner

OBJECTIVE CHANGER

CROSS REFERENCE TO RELATED APPLICATIONS

This application is a continuation of U.S. patent application Ser. No. 12/797,388, filed Jun. 9, 2010, which claims priority to German Application Nos. DE 10 2009 029 146.6, filed Sep. 2, 2009 and DE 10 2009 026 978.9, filed Jun. 16, 2009, the entire disclosure of each being hereby incorporated by reference herein.

FIELD

The present invention relates to an objective changer for a microscope having a changing device for at least two objectives as well as to a microscope having such an objective changer.

BACKGROUND

Objective changers of this type are known from the prior art. In addition to the known objective turrets, in which several objectives are mounted on a carrier in circular arrangement and the desired objective can be swiveled into the operating position by rotating the carrier, objective changers are known in which objectives can be individually brought from a stand-by position into an operating position which is common to all objectives.

The latter type of objective changers has proved to be advantageous in particular for applications in the field of electrophysiology since hereby a large free space around the objective and the object can be created. Typically, for applications in electrophysiology a sample stage having a sample placed thereon is no longer moved after positioning of the sample. On the one hand, this is because of the often existing touch and vibration sensitivity of the samples to be examined and, on the other hand, because of the fact that the examined biological samples are often manipulated during their observation. Such manipulations require a large free space around the object. Often, the preparation is accessed by several manipulators at the same time. Via the manipulators, for example current, voltage as well as dyes, liquids etc. are applied to the sample or substances are injected into the sample. Often, the manipulators remain in their position relative to the sample throughout the entire examination. In addition to the demand for a large free space, it has to be taken into account that there is a wish to be able to use several (i.e. at least two) objectives for object examination in order to be able, for example, to change from a general image having a low magnification to a detailed image having a high magnification.

When changing an objective, it has to be taken into account that the objectives used in electrophysiology mostly have a very little working distance to the examined preparation or even dip into the liquid often surrounding the preparation. In most cases, the preparations are placed in dish-shaped containers, the so-called Petri dishes. When changing an objective it has to be secured that the objective is raised over the edge of the container and the new objective is only lowered when it has reached the inner area of the container. In doing so, any movement of the sample stage for facilitating the objective change is to be avoided.

Against this background, DE 10 2007 042 260 A1 of the applicant suggests an objective changer having a changing device for at least two objectives in which each of the objectives can be pendulously swung into its operating position near the focal position via the changing device. From the operating position, the objectives can be swung into a stand-by position. Advantageously, the pendulous swinging motion takes place in one plane. Swinging-in of the one objective can cause the swinging-out of the other objective. In addition, the objectives can be lowered during swinging-in and raised during swinging-out. As the entire swinging area of the objectives has to be kept free of manipulators, this objective changer proved to be disadvantageous for some applications.

The swinging-out of an objective from an observation position into a stand-by position for avoiding obstructions and intersections in the case of examinations in the field of electrophysiology also represents the basic principle of the teaching of JP 09258088A.

For the examination of samples in a sample chamber filled with immersion medium, DE 10 2007 018 862 A1 suggests an objective changing device for a microscope having two fixed objectives which are arranged movably with respect to the sample chamber. By a corresponding displacement, one of the two objectives can be brought into the operating position, while the respective other one is in the stand-by position.

EP 1 168 027 B1 suggests an objective changer by means of which the longitudinal axis of the objective can be moved substantially coaxially to the optical axis of the objective for an objective change. In one embodiment, an objective can be moved along a curved guide rail, this curve extending approximately parabolically, the plane of the parabola including the optical axis of the objective and the apex of the parabola corresponding to the desired position (operating position) of the objective. In another embodiment, the objective is raised from its desired position by means of a gripper arm in the direction of its optical axis and is brought into a storage position (stand-by position) by means of a swivel arm. In still another embodiment, a selected objective is brought from a storage position via a feed channel extending coaxially to the optical axis of the objective but perpendicular to the optical axis of the microscope into its desired position, wherein it has to be erected for this purpose from a "lying position" into an "upright position" so that the optical axis of the objective coincides with the one of the microscope.

Finally, from DE 198 22 870 C2 a device for an objective change in an up-right microscope having at least two objectives and an associated focusing device is known, which can move the objective located in the active position (i.e. in the operating position) in the direction of the optical axis, as well as having a common carriage receiving the objectives in objective holders, which carriage can be moved perpendicular to the optical axis for objective change. Here, for moving the carriage one single actuating element is provided with which in addition also the desired objective can be raised or lowered and be brought into the active position. This actuating element is a rod mounted on the carriage, which rod is used as a pull rod in order to bring one of the two objectives mounted on the carriage into the operating position and the other one into the stand-by position. When rotated, the rod actuates a lever which interacts with an objective holder in order to raise or lower the same. Given this solution it proves to be disadvantageous that the two objectives are in a fixed position relative to one another so that the free working space is highly restricted because of the second objective which is located in the stand-by position and arranged in the direction of the user.

SUMMARY

In an embodiment, the present invention provides a microscope objective changer including a changing device for changing at least two objectives. A movable objective holder corresponds to each objective. Each movable objective holder is configured to receive a respective one of the objectives and to transfer the respective objective along a respective displacement path from an allocated stand-by position into an operating position, with the operating position defining an optical axis. The respective displacement paths are different from one another. A carrier is associated with each objective holder and includes a guide groove constituting the respective displacement path. Each displacement path includes a first portion beginning at the respective stand-by position and extends substantially perpendicular to the optical axis and a second portion directly bordering the first portion that includes a downwardly component in a direction parallel to the optical axis such that each objective holder is movable from the respective stand-by position to the optical axis of the operating position when reaching a lower end of the second portion of the displacement path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
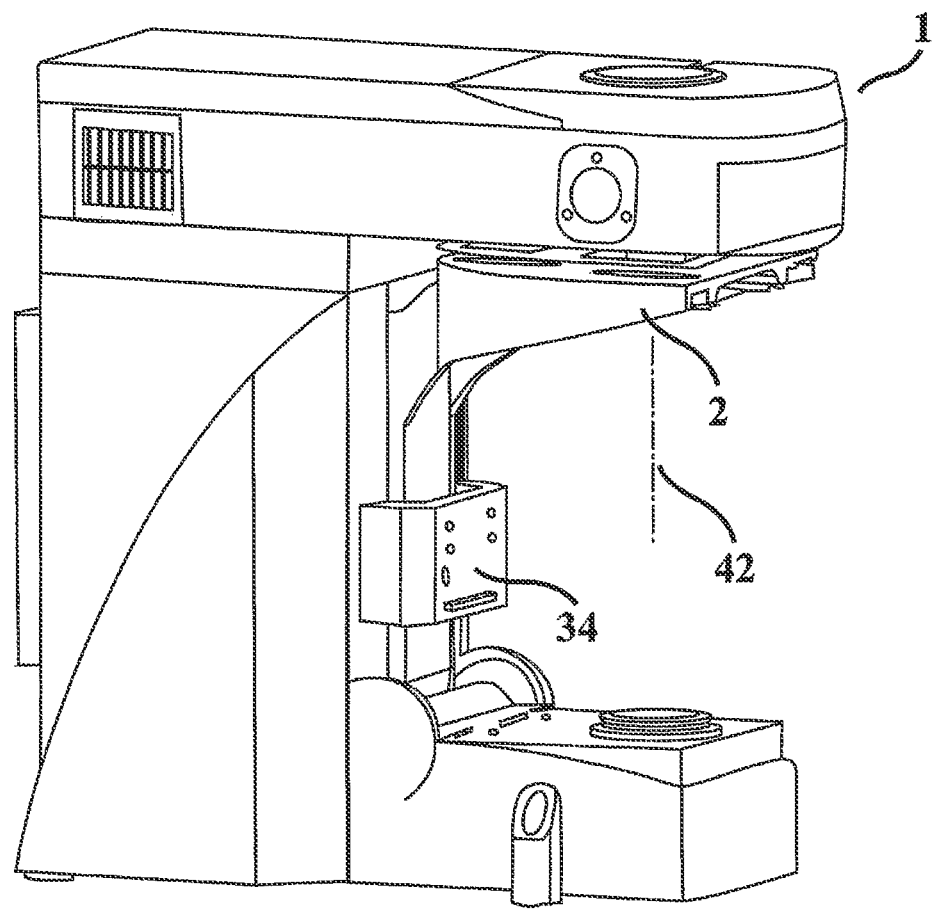
FIG. 1 is a perspective view of a microscope in which the objective changer according to the invention can be used.

Against this background, it is the object of the present invention to specify an objective changer which makes possible an objective change that is as easy as possible while providing the largest-possible free space around the objective located in the operating position and the preparation to be examined.

In an embodiment, the objective changer, which has a changing device for at least two objectives, by means of which one objective each can be transferred from a stand-by position into an operating position, the objective located in the operating position defining an optical axis, is characterized in that for each objective the changing device has a movable objective holder for transferring an objective from a respective stand-by position assigned thereto into the operating position along a displacement path which is different from the one of other objectives, each displacement path being oriented substantially perpendicular to the optical axis at least within a first portion.

Here, it is useful when for each objective one drivable carriage each is provided on which an objective holder can be mounted.

The objectives can be moved directly at their respective objective holders either manually or by a motor. Usefully, carriage are provided which carry the objective holders and which in turn can each be driven manually or by a motor. For reasons of simplicity, the latter case is to be assumed in the following, i.e. the presence of a carriage on which an objective holder is arranged which in turn can carry an objective.

With an objective changer of this type, thus each objective is moved substantially perpendicular to the optical axis by means of a drivable carriage assigned thereto. Thus, this is not the usual arrangement of objectives on a rotating disk, where the desired objective is brought into the operating position by rotation of the rotating disk. In the typical case of application of a microscope, which is to be assumed in the following in a non-limiting manner, the optical axis usually extends in vertical direction so that the objectives are moved in horizontal direction in the objective changer according to the invention. Here, it is useful to move the objectives away from the user when the objective is brought from the operating position into its stand-by position. Usefully, the mentioned (first) portion of the displacement path constitutes the main part of the entire displacement path of an objective from its stand-by position into the operating position. Since each objective has its own displacement path, they can be moved independent of one another. As a result thereof, the possible free space compared to objective changers having objectives that are fixedly coupled to one another is increased even more since all objectives which are not required can be moved into respective stand-by positions lying outside the required free space, wherein each time space-optimized displacement paths can be defined.

In a first embodiment, the mentioned (first) portion of the displacement path constitutes the entire displacement path from the stand-by position to the operating position so that in the example mentioned the objective is moved along a horizontal displacement path from its stand-by position into the operating position. In another embodiment, the mentioned first portion is directly bordered by a second portion of the displacement path, wherein the end of the second portion can represent the operating position of the objective or at least can lie in direct proximity to the operating position of the objective. The provision of such a second portion is particularly advantageous in the mentioned applications of an objective changer for a microscope in the field of electrophysiology. The second portion of the displacement path then usefully forms the area in which the objective is moved within the inner area of a container (Petri dish) in the direction towards or away from the object to be examined. The displacement path within the second portion can then have a vertical movement component in addition to the horizontal movement component in terms of vector geometry.

In the objective changer according to the invention, each objective has its own displacement path, wherein it is advantageous when the displacement paths within the (first) portions lie in one common plane and in particular extend in a straight line and/or in a curved manner. In the example mentioned, the displacement paths within the (first) portions thus advantageously lie in a horizontal plane and, for example, extend in straight lines towards one another in a fan-shaped manner. Also curved courses within the mentioned plane are conceivable, just as is a combination of straight and curved courses. What is decisive for the selection of the courses of the displacement paths is that the objectives can be transferred from their respective stand-by position into the operating position in a collision-free manner. On the other hand, the displacement paths must lie as close to one another as possible so that the free working space is restricted as little as possible. In the mentioned case where they run to one another in straight lines in a fan-shaped manner, each time two adjacent straight displacement paths are arranged in V-shape.

The invention makes it possible to move a selected objective individually into the operating position, while the other objectives remain in their respective stand-by positions, wherein these stand-by positions can be chosen sufficiently far away from the operating position so that the objectives in stand-by do not effectively limit the free working space. Further, it is secured that the objectives can be transferred in horizontal direction (perpendicular to the optical axis of a microscope) and thus, for example, away from an observing person into their stand-by positions. Such substantially horizontally extending displacement paths can be realized, in particular in microscopes, with a relatively low technical expense, as will be shown by the embodiments explained further below. The horizontal movability of the objectives results in a far greater free space compared to vertical displacements since the latter usually have a disturbing effect, limit the free space and finally require a high construction expense.

It is particularly advantageous if the displacement paths along which the objective holders can be moved are arranged in the changing device such that all objectives arranged in an objective holder can simultaneously assume a respective parking position, in particular their respective stand-by position. In this way, all objectives can in particular be parked in a rear position as viewed from the user. As a result thereof, the sample space becomes free for e.g. manual manipulation.

It is advantageous if the carriage of an objective or an objective holder on which the objective is mounted can be moved along at least one guide rod. The at least one guide rod extends advantageously exclusively in a straight line. Of course it is likewise conceivable that a guide rod represents the entire displacement path of an objective from its stand-by position into the operating position so that, as viewed from the stand-by position, the guide rod, for example, first extends horizontally straight (first portion) to then get a vertical component (downwardly curved second portion).

Alternatively, a carriage can also be movable along a guide groove provided in an adjusting unit. In this case, the guide groove represents the displacement path of an objective from its stand-by position into the operating position.

What is particularly advantageous is a combination of both features mentioned, namely that the carriage is movable on the one hand along at least one guide rod which in particular extends in a straight line, and on the other hand that the carriage is movable along a guide groove that defines the displacement path from a stand-by position into the operating position. For this, the carriage is in particular connected via the at least one guide rod to a guide receptacle of an adjusting unit. Thus, the guide receptacle so to speak holds the at least one guide rod along which the carriage moves. On the other hand, the guide groove is in particular formed on a stationary carrier of the adjusting unit. By coupling the carriage and the guide receptacle to the guide groove in the stationary carrier it can now be caused that the carriage moves, on the one hand, along the guide rods within the guide receptacle (linear) while, on the other hand, it simultaneously passes through the desired defined displacement path due to the coupling to the guide groove in the stationary carrier. For this, the guide receptacle of the carriage must usefully be movably or pivotably mounted in the stationary carrier. As already described, the displacement path is advantageously comprised mainly of a horizontally extending first portion which is bordered by an angled second portion by which the objective can be brought into its final operating position (by lowering the same). This solution makes possible a particularly accurate and stable displacement of the objectives.

Further, it is advantageous if for each carriage an own drive is provided. Such a drive can be provided, for example, by a threaded spindle. Alternatively, it is also conceivable to move several carriages via one drive, wherein the moving of an objective into the operating position would have to cause the simultaneous moving of the other objectives into their stand-by positions, which in particular in the case of two objectives can be realized relatively easily. The drive can be accomplished either manually or by a motor.

In the objective changer according to the invention, the objectives can be moved in a fixed spatial orientation along their displacement paths, i.e. for example with their longitudinal axis always parallel to the above-defined optical axis. It can however be advantageous to transport the objectives in an inclined position from a stand-by position in the direction of the operating position and to bring them into an upright position only after reaching the operating position (or shortly before), in which upright position their longitudinal axis extends parallel to the optical axis. By providing such an inclination, the free space underneath the objective to be moved can be increased. Further, in the mentioned application in electrophysiology, the container edge can be easily overcome by such an inclination so that only after reaching the container interior the objective can be erected (corresponding to the position in the operating position). For example, it can be provided that the objective is moved in an inclined position over the mentioned first portion, while it already assumes an upright or at least more upright position (corresponding to the one in the operating position) in the mentioned second portion. However it can also be provided that the mentioned upright position is only assumed when the operating position is reached. In order to realize these possibilities mentioned, it is advantageous when the objective holder is arranged so as to be pivotable on the carriage and is connected to the carriage via a biasing device and/or a lever mechanism by which the center axis of the objective holder (corresponding to the longitudinal axis of the objective present in the objective holder) can be held under an inclination angle relative to the above-mentioned optical axis at least in the first portion of the displacement path.

The biasing device mentioned can be a device which holds the objective holder, which is pivotably arranged on the carriage, by means of a (tension or pressure) spring, which is inclined relative to the pivot axis and connects the objective holder to the carriage, in an inclined manner relative to the horizontal plane, wherein a stop can be provided in order to limit the angle of inclination. The longitudinal axis of an objective inserted into the objective holder then has an angle of inclination relative to the vertical or the optical axis which is defined by the longitudinal axis of the objective in the operating position. When the objective reaches its operating position, a mechanism must be provided which can bring the objective from a possibly still inclined position into an upright position against the spring force. Examples of such mechanisms will be explained further below.

The lever mechanism mentioned for creating an angle of inclination can, for example, comprise a lever pivotably mounted on the carriage, which lever interacts with a pin mounted on the objective holder in order to create the mentioned angle of inclination. For this, the objective holder is in turn pivotably arranged on the carriage. When using a lever mechanism, the inclination angle mentioned can also be chosen larger so that the objectives can be kept away as far as possible from possible containers or objects on the sample stage. For this, the lever mechanism can be designed such that when passing through the first horizontal portion of the already mentioned guide groove of the adjusting unit the objective is held by the lever in a highly inclined position which can exceed the inclination caused by the spring. When reaching the second angled portion of the guide groove of the adjusting unit, the lever starts to tilt so that the objective leaves the highly inclined position and reduces the angle of inclination. In the further course, the guide of the carriage likewise reaches the angled portion so that, as a result thereof, a lowering of the objective is caused, this resulting in a further reduction of the angle of inclination. When the operating position is reached, the angle of inclination finally is zero degree so that the longitudinal axis of the objective coincides with the optical axis. A specific example of such a lever mechanism is dealt with in every detail in connection with the embodiments.

It is advantageous if the changing device of the objective changer, in particular the mentioned adjusting units for the objectives is or are connected to an intermediate plate on which, for example, a centering mount for the fixed positioning of an objective holder is arranged. The centering mount is located at the operating position of the objective and receives the objective holder in a defined spatial position so that an exact alignment of the longitudinal axis of the objective along the optical axis (of the microscope) is secured. The provision of the mentioned intermediate plate makes a modular structure of the objective changer possible. In the mentioned example of the microscope with objective changer, the mentioned intermediate plate can, for example, be connected to a corresponding counter-receptacle on a support element of the microscope via a dovetail connection. The support element can be adjustable in focusing direction.

The invention further relates to a microscope having an objective changer according to the invention. With regard thereto, reference is made to the above explanations, in particular in connection with the example of a microscope. Such microscopes usually have a support element which is adjustable in focusing direction and on which the changing device of the objective changer, in particular the mentioned adjusting units, can be mounted. In this case, a centering mount for the fixed positioning of an objective holder is usefully arranged on the mentioned support element of the microscope. An alternative to this embodiment is the already mentioned modular design using an intermediate plate. With the latter design, the centering plate can also be mounted on the microscope (or its support element).

It is pointed out that the features of the invention and their designs cannot only be used in the combination set forth herein but also in other combinations or alone.

Unless described otherwise, the figures are comprehensively dealt with in the following. The same reference signs identify the same components. The embodiments deal with specific examples of the invention and shall not be construed as limiting the invention. The above explanations in connection with the claims will guide the person skilled in the art to make generalizations and variations of the embodiments illustrated herein.

FIG. 1 shows a microscope 1, as used in particular in the field of electrophysiology. The support element which is adjustable in height in focusing direction has the reference sign 2. This support element 2 supports the objective changer with the objectives. For the purpose of focusing, the support element 2 is adjustable in height. A sample stage with a sample placed thereon is mounted on the stage holder 34 of the vertical post of the microscope 1. Due to the touch and vibration sensitivity of the samples to be examined the sample stage is no longer moved after positioning. During the examinations the working distance to the examined preparation is often very short; often the objectives can even dip into the liquid surrounding the preparation. For the examination of the preparations, these are usually manipulated, i.e. via precision-mechanically formed manipulators current, voltage or specific substances are applied to specific preparation areas. Throughout the entire examination, these manipulators remain in their position relative to the sample. During the examination it is however usually necessary to change the objectives in order to obtain different (detailed) images of the sample. The manipulations require a large free space around the currently used objective and the object, wherein this free space must not be restricted even when the objectives are changed since the manipulators have to be kept in an unchanged position during an objective change.

Figure 2:
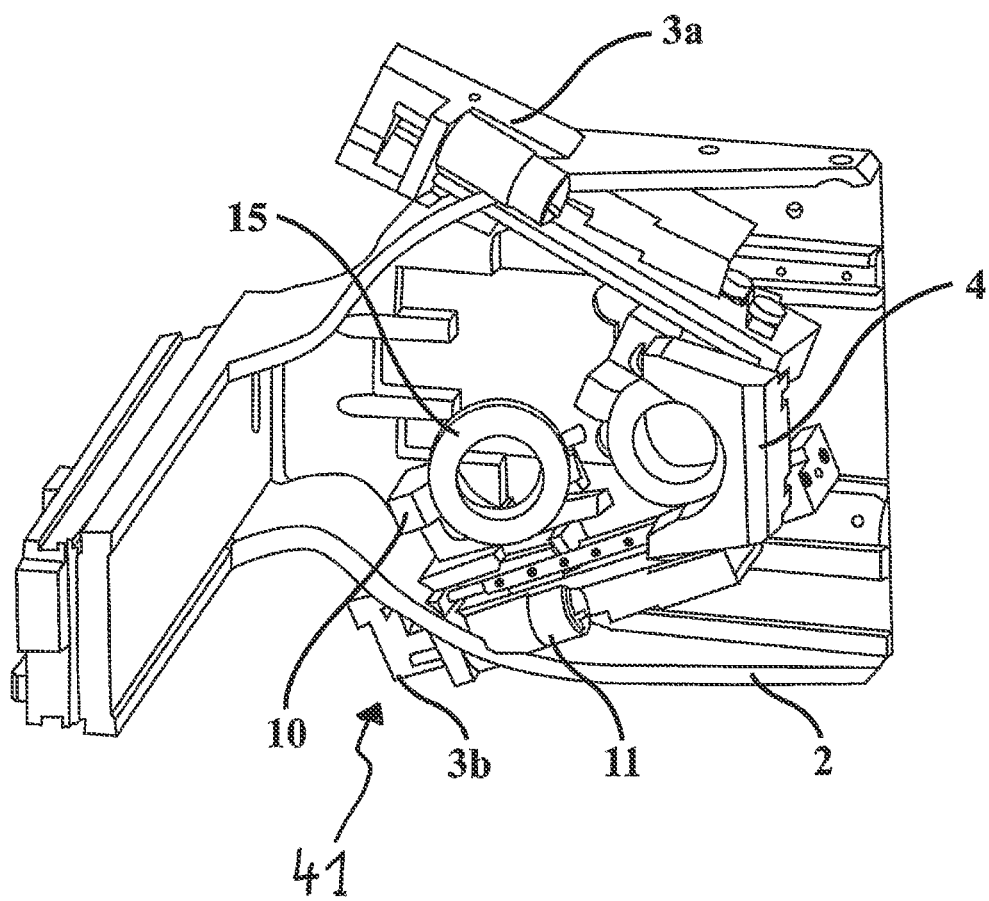
FIG. 2 is a perspective bottom view of a support element of a microscope of FIG. 1 with an embodiment of the objective changer according to the invention.

FIG. 2 is a bottom view of the support element 2 of the microscope 1 of FIG. 1. Therefrom, the changing device 41 of the objective changer can be taken. In this embodiment, this changing device 41 is designed for two objectives and thus has two adjusting units 3a, 3b. These adjusting units 3a, 3b are mounted on the support element 2. Each adjusting unit 3a, 3b has a drive 11 and a carriage 10 with an objective holder 15 arranged thereon. The structure of each adjusting unit 3a, 3b will be explained in more detail further below. Likewise illustrated in FIG. 2 is a centering mount 4 which, in the embodiment according to FIG. 2, is fixed to the support element 2. From FIG. 2, the arrangement of the adjusting units 3a and 3b can clearly be seen, which both are arranged in a V-shape relative to one another and lie in one plane which is perpendicular to the optical axis 42 of the microscope 1 (see FIG. 1). This optical axis 42 is accordingly defined by the longitudinal axis of an objective 19 located in the operating position (see also FIGS. 10 and 14). Each carriage 10 moves an objective holder 15 in order to transfer the objective 19 present in the objective holder 15 from its stand-by position into the operating position. The stand-by positions of different objectives are different from one another just as are the respective displacement paths. The operating position is the position in which the microscope 1 can provide an image of the preparation to be examined with the aid of the objective 19.

In order to obtain a free space for preparation manipulation that is as large as possible, the objective 19 has to be transferred from the operating position into its stand-by position in as little space as possible. This takes place via the adjusting units 3a and 3b illustrated in FIG. 2, which move the objective along a displacement path which is assigned thereto and oriented perpendicular to the optical axis 42. Due to their own drives 11, each objective holder can be moved independent of the other. This independent movability likewise reduces the space requirement compared to objective changers having fixedly coupled objectives/objective holders. Finally, the horizontal movability provides for a large free space compared to a vertical movability since a vertical movability—as can be taken from FIG. 1—highly interferes with the space between the sample stage and the support element, which space is already restricted anyway. By arranging the adjusting units 3a and 3b in a V-shaped manner, two objectives are alternatingly moved "rearwards", as viewed from a user of the microscope 1, thus away from the user, as a result whereof even more free space is created. In particular, both objectives can be moved "rearwards" into their respective stand-by position as viewed from the user, so that both objectives are simultaneously "parked" in their stand-by position. As a result thereof, the sample space is free for manual manipulations.

Figure 3:
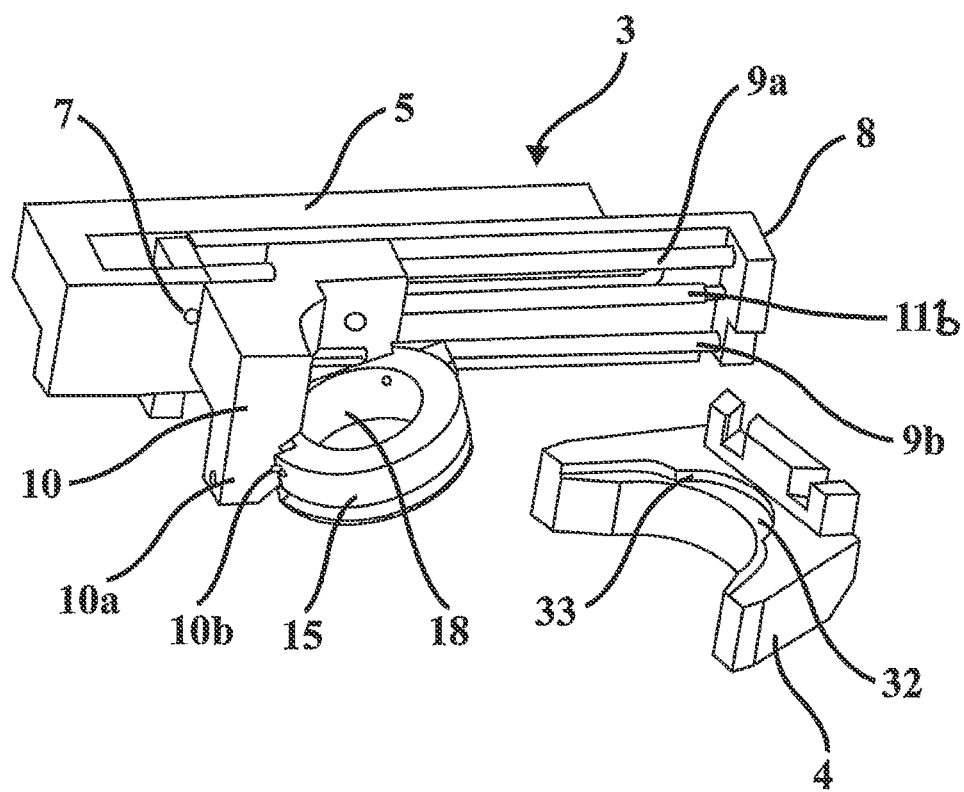
FIG. 3 is a perspective illustration of an adjusting unit of an embodiment of the objective changer according to the invention with a centering mount.

FIG. 3 shows a detail view of an adjusting unit 3 (corresponding to the adjusting units 3a and 3b of FIG. 2). Additionally illustrated is a centering mount 4 (similar to the illustration in FIG. 2). The latter centering mount 4 is again mounted on the support element 2 of the microscope 1 and is fixedly oriented to the optical axis 42. By functional engagement between an objective 19 and the centering mount 4 a spatially fixed positioning of an objective 19 in its operating position is secured.

The adjusting unit 3 has a carrier 5 mounted on the support element 2 which is adjustable in height (see FIG. 2). This carrier 5 has a bearing bore 7 in which a guide receptacle 8 is mounted so as to be pivotable in vertical direction. This guide receptacle 8 receives the carriage 10 on which the objective holder 15 is arranged. The latter usually includes an objective thread 18 for receiving an objective 19. The guide receptacle 8 includes at least one guide rod 9a, 9b and a threaded spindle 11b in the case of a threaded spindle drive 11. The carriage 10 can be moved along the threaded spindle 11b and along the guide rods 9a, 9b. The support arm 10a of the carriage 10 has a point of support 10b for the (inclined) mounting of the objective holder 15. On this, reference will be made in detail further below.

If a movement of an objective in horizontal direction only is sufficient to bring an objective from its stand-by position into the operating position, the guide receptacle 8 could be directly fixed to the support element 2 (see FIG. 2). If it is however desired to lower the objective in the direction of the preparation shortly before reaching the operating position, the two-part structure having a guide receptacle 8 that can be pivoted in vertical direction as well as a stationary carrier 5 is advantageous. The mode of operation will be explained in the following.

Figure 4:
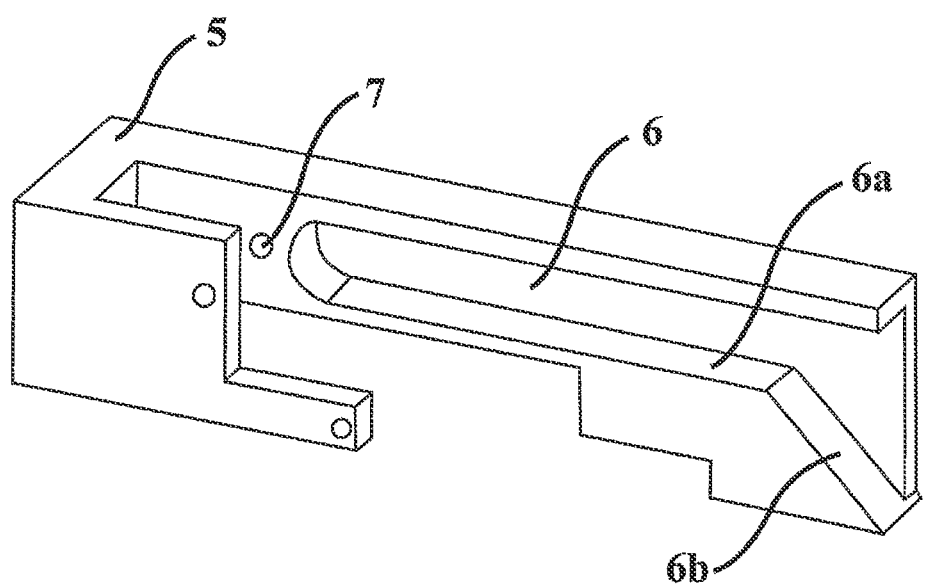
FIG. 4 shows the carrier of the adjusting unit of FIG. 3.
Figure 5:
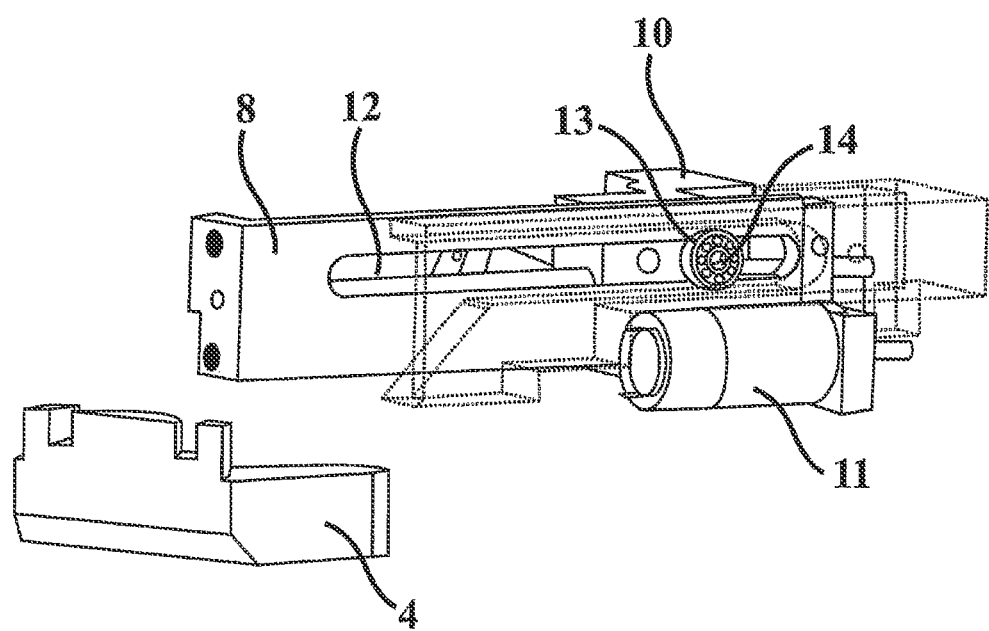
FIG. 5 shows the rear view of the adjusting unit of FIG. 3 without the carrier of FIG. 4.

FIG. 4 shows a perspective view of the carrier 5 of FIG. 3. The bearing bores 7 for receiving the guide receptacle 8 in a vertically pivotable manner are visible. On its inner side (facing the guide receptacle 8) the carrier 5 has a guide groove 6 which has a first horizontal portion 6a and a second angled portion 6b. The horizontal portion 6a serves to move the objective from its stand-by position in the direction of the operating position along a displacement path which is oriented substantially perpendicular to the optical axis 42. The second portion 6b serves to lower the objective in the direction of the preparation and thus to bring the objective into its operating position. While, in the illustration according to FIG. 3, the carriage 10 moves linearly over the displacement portion of the guide receptacle 8, the guide receptacle 8 is lowered when the angled portion 6b is reached. For this, the carriage 10 is oriented in the guide groove 6 of the carrier 5 via a bolt 14 projecting through a slot 12 in the guide receptacle 8, which bolt carries a (ball) bearing 13. With respect thereto, reference is made to the illustration according to FIG. 5, which shows a rear view of FIG. 3.

The operation sequence is as follows: As a starting position the rear stand-by position may be taken here in which the objective 19 is furthermost from the preparation. When starting the adjustment, the carriage 10 is set into motion by the threaded spindle drive 11 with the threaded spindle 11b and held via the (ball) bearing 13 so as to be oriented in the horizontal portion 6a of the guide groove 6. When the bearing 13 reaches the angled portion 6b of the guide groove 6, the guide receptacle 8 starts to pivot downwardly about the bearing bore 7 (see FIG. 3). As a result thereof, the inclination of the objective longitudinal axis relative to the vertical is reduced. These two movements take place until the objective holder comes into engagement with the centering mount 4. The objective 19 is then in its operating position. At this position, the bearing 13 is located outside the guide groove 6, as a result whereof the objective 19 is oriented in the optical axis by the centering mount 4 alone.

Figure 7:
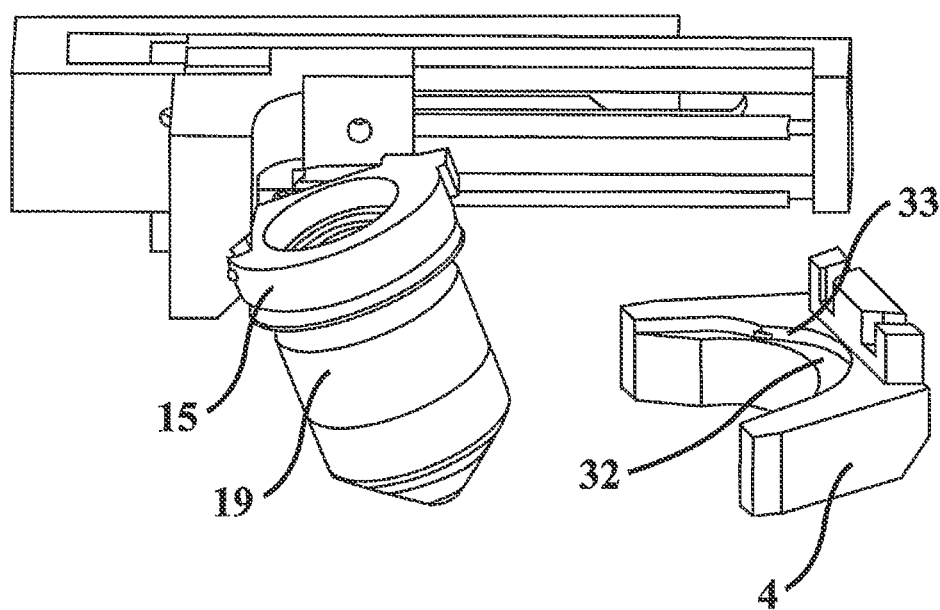
FIG. 7 shows an illustration similar to the one of FIG. 3 with an objective.
Figure 8:
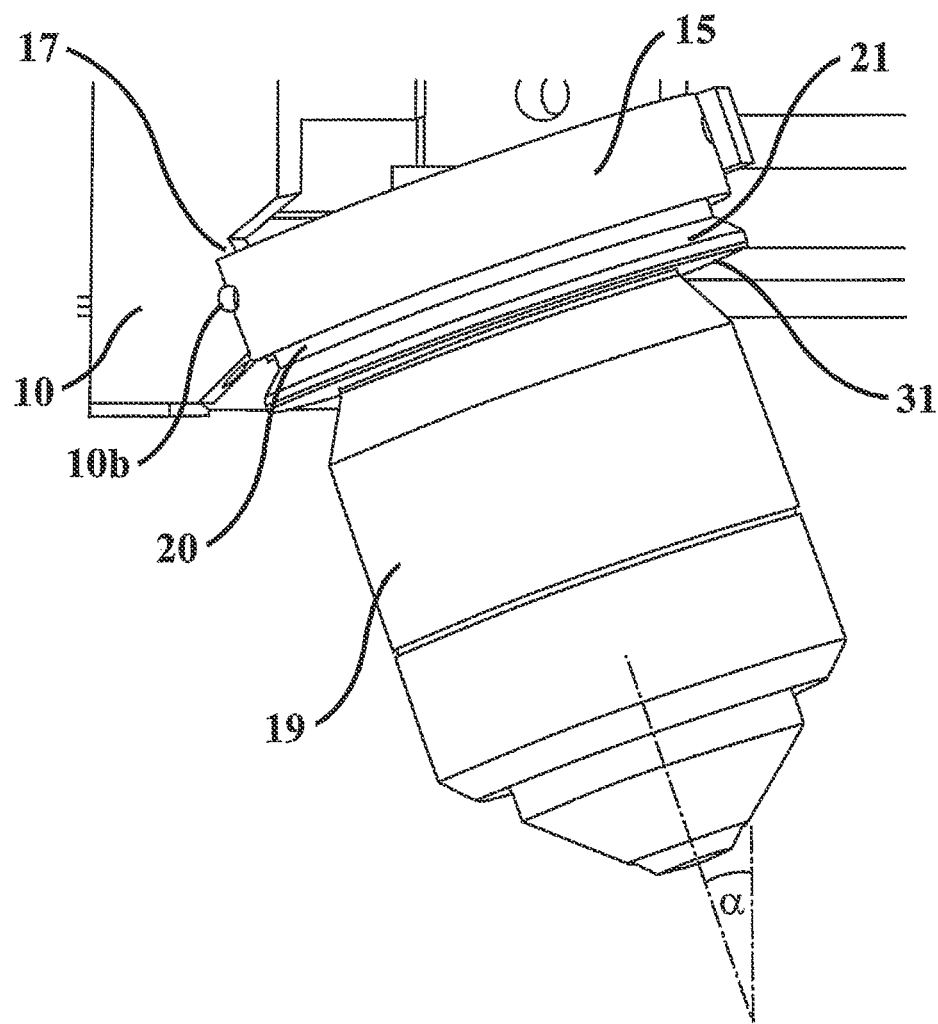
FIG. 8 shows an embodiment of an objective holder with objective.

A description of the mentioned engagement between the objective holder 15 and the centering mount 4 is given with reference to FIGS. 3, 7 and 8. FIG. 7 substantially shows the same illustration as FIG. 3, wherein merely one objective 19 is mounted on the objective holder 15. Details of the objective holder 15 are illustrated in FIG. 8. The outside of the objective holder 15 is cylindrical in shape with a groove 20 and a beveled side 21 and a bottom surface 31. The centering mount 4 has a surface 32 and a counter bearing 33. When the guide receptacle 8 lowers itself upon reaching the angled portion 6b (see FIGS. 3 and 4), then the objective holder 15 is lowered until the surface 31 of the objective holder 15 rests on the surface 32 of the centering mount 4. The beveled side 21 of the objective holder 15 then rests against the two counter bearings 33 in the centering mount 4. From FIGS. 3, 7 and 8, moreover an inclined position of the longitudinal axis of the objective 19 in relation to the optical axis 42 can be seen. Hereto, reference is made in more detail further below. It is however noted that such an inclined position is not a necessary prerequisite for the objective changer illustrated here. Rather, the longitudinal axis of the objective 19 can be oriented parallel to the optical axis 42 during the entire displacement path. The inclination of the longitudinal axis 19 is however advantageous in order to bring an objective 19 over the edge of a container in which the preparation to be examined is located while providing a free space as large as possible. The inclined longitudinal axis of the objective 19 then avoids an additional vertical adjusting space which would limit the free space.

Figure 9:
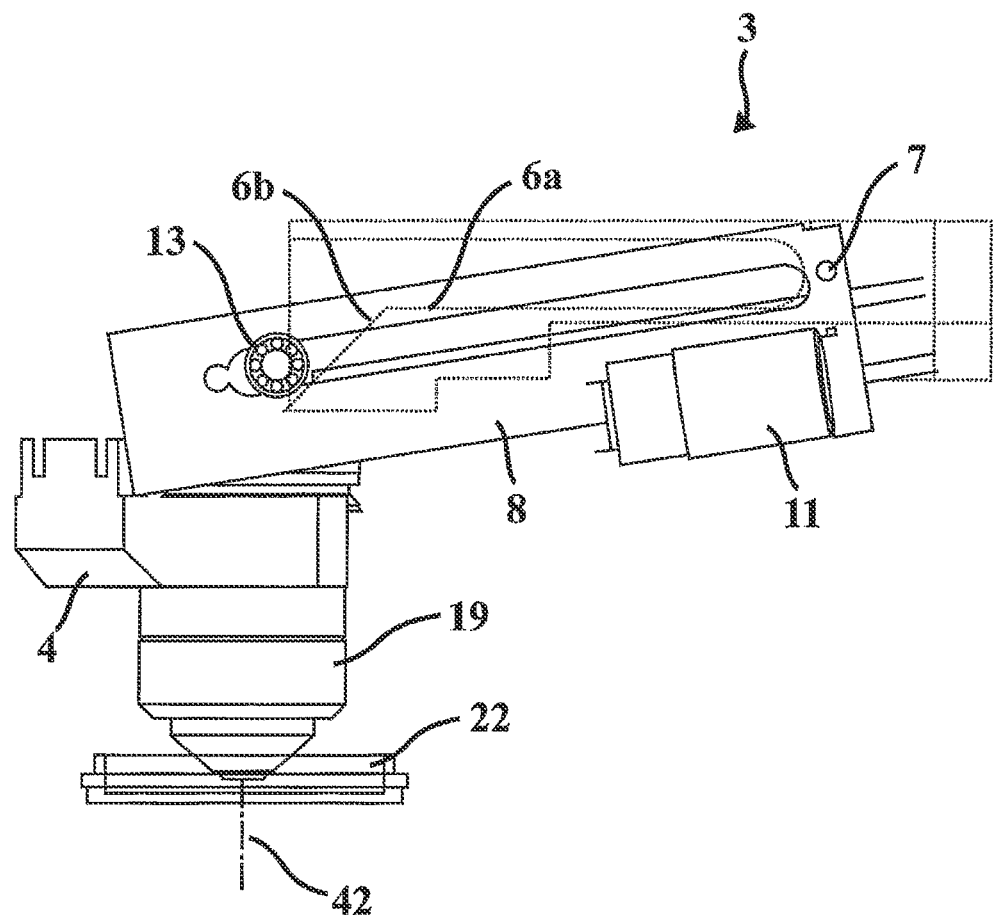
FIG. 9 shows a view of an adjusting unit similar to the one of FIG. 5, wherein an objective holder with objective which is lowered over a container can be seen.

FIG. 9 shows an adjusting unit 3 of an objective changer in which the objective 19 is in its operating position. The objective 19 is oriented in the optical axis 42 merely by the centering mount 4. The objective 19 projects into a dish-shaped container 22 in which the preparation to be examined is contained. The first horizontal portion 6a and the second angled portion 6b (with vertical adjustment component) can be seen, the (ball) bearing 13 having arrived at the end of the second portion 6b.

Figure 6:
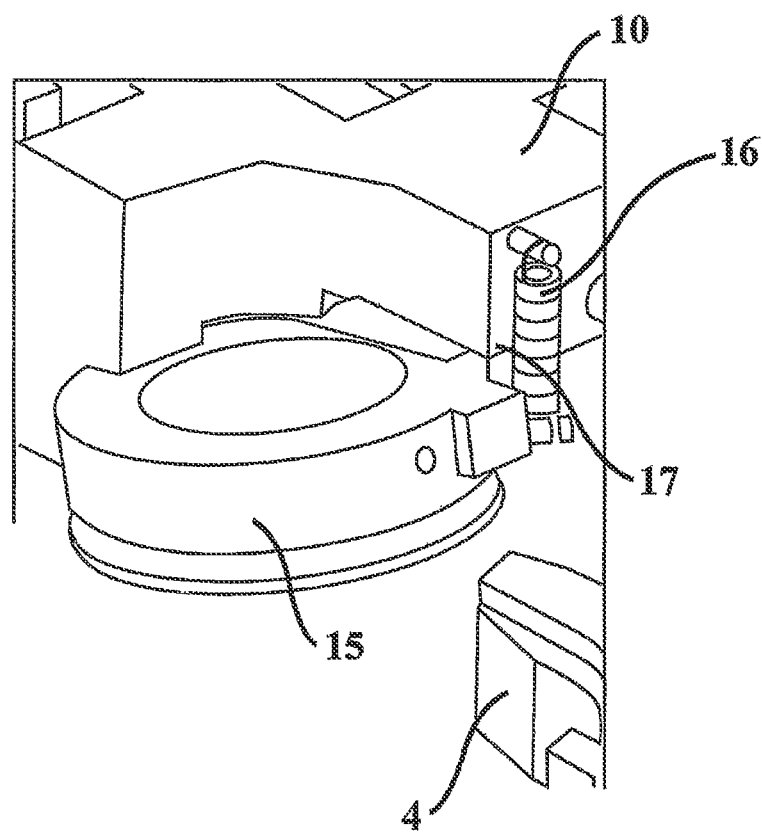
FIG. 6 shows a detail of an embodiment of a carriage with an objective holder.

One possibility of the inclination of the longitudinal axis of an objective 19 relative to the optical axis 42 is shown in the embodiment according to FIG. 6. As can be taken from the illustration in FIG. 3, the carriage 10 has a support arm 10a with a point of support 10b at which an objective holder 15 is arranged so as to be pivotable in vertical direction. Via a biasing device comprised of a spring 16 and a stop 17 on the carriage 10 the objective holder 15 is pulled against the stop 17 in an inclined manner by the spring force of the spring 16 mounted on the carriage 10 and the objective holder 15 so that the longitudinal axis of the objective 19 comprises an angle of inclination α with respect to the vertical or the optical axis 42. When lowering the guide receptacle 8 along the second angled portion 6b, the angle of inclination α is reduced until upon reaching the centering mount 4 and upon engagement between the objective holder 15 and the centering mount 4 the angle of inclination is reduced to zero degree.

FIG. 10 once again schematically shows the sequence of motions of an objective 19 on its way into the operating position. Within the first portion of the displacement path an inclination of the longitudinal axis of the objective 19 relative to the vertical or the optical axis 42 can be seen. As can be taken from FIG. 9, a lowering of the guide receptacle 8 (pivotably mounted about the bearing bore 7) takes place within the second portion 6b, which results in a reduction of the angle of inclination of the objective axis until the longitudinal axis of the objective coincides with the optical axis 42 when the objective holder 15 and the centering mount 4 are engaged. From FIG. 10 it can be seen that the drawn-in measure "A" indicates the distance between the objective underside 19 in the inclined position and the one in the vertical position. The objective 19 can consequently move over a container edge in the inclined position and thereafter (when displaced along the second portion 6b) "dip" into the container interior. Assuming that the objective 19 quasi sits on the sample or on the liquid surrounding the sample, the measure A represents the height of the container edge, which height can be overcome by the inclination of the objective 19.

Figure 10:
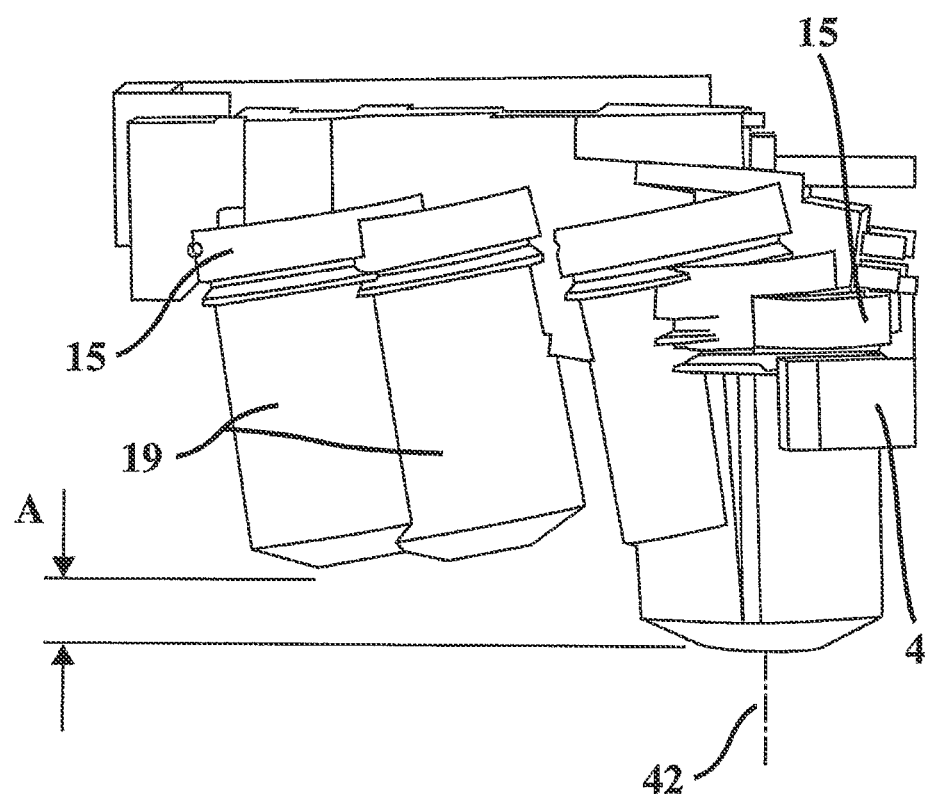
FIG. 10 schematically shows the sequence of motions of an objective from a stand-by position into the operating position.

If the measure A of FIG. 10 is to be increased then at first a higher inclination of the objective longitudinal axis is required. This can be realized, for example, by the provision of a lever mechanism, as will be explained with reference to FIGS. 11 to 14.

Figure 11:
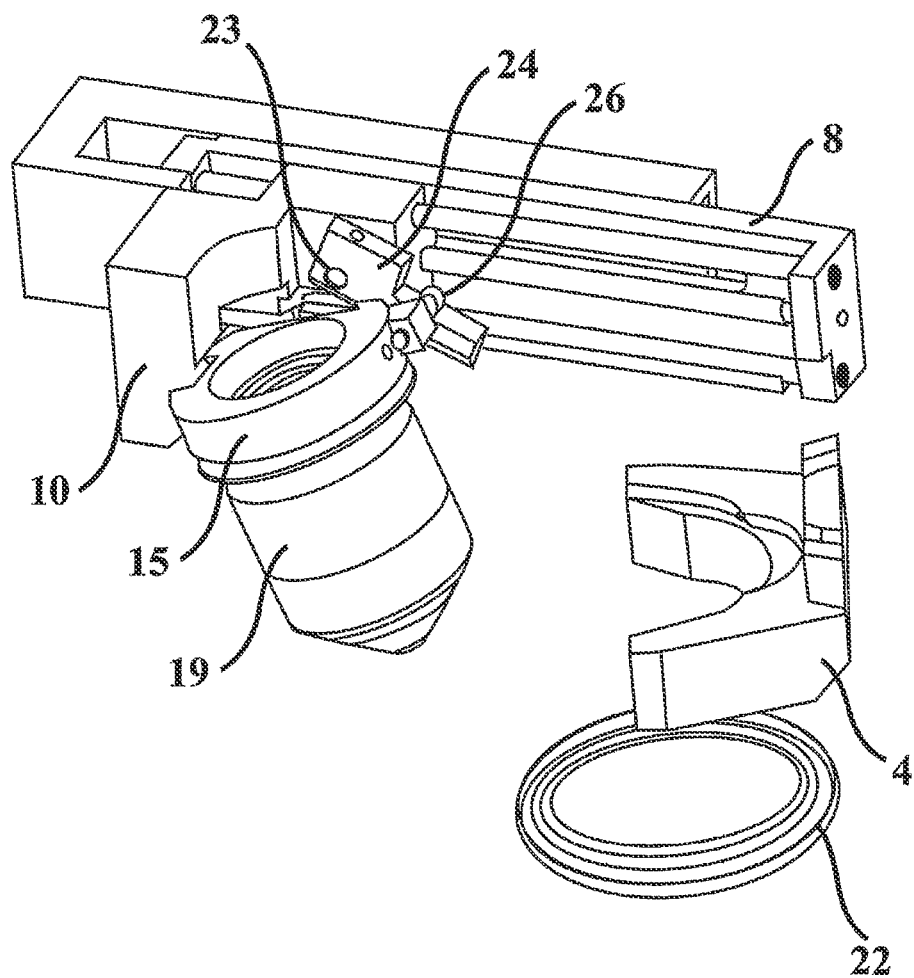
FIG. 11 shows an adjusting unit of an embodiment of the objective changer according to the invention with a lever mechanism for inclining the objective axis.
Figure 12:
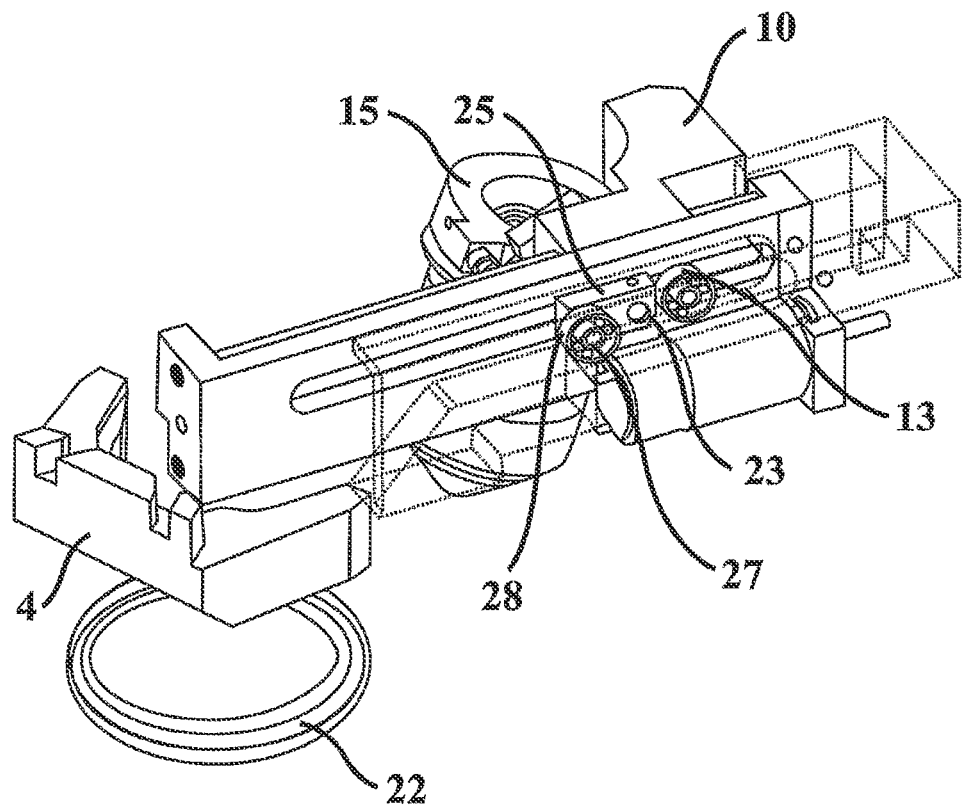
FIG. 12 is a rear view of the illustration of FIG. 11 without the carrier of the adjusting unit.

FIGS. 11 and 12 show a lever mechanism 23 to 28 for increasing the measure A shown in FIG. 10. The lever mechanism comprises an objective-side lever 24 which is pivotably mounted on the axis 23 of the carriage 10. A pin 26 on the objective holder 15 is connected to an arm of the lever 24 in that the lever 24 engages under the pin 26 and, as a result thereof, holds the objective holder 15 in a highly inclined position. A second lever 25 likewise mounted on the axis 23 is located on the other side of the guide receptacle 8, i.e. on the side opposite to the carriage 10. On this second opposite lever 25, a (ball) bearing 28 is mounted via a bolt 27, which bearing—such as the bearing 13 of the carriage 10—orients itself in the guide groove 6 of the carrier 5 of the adjusting unit 3 (see FIGS. 3 and 4).

Figure 13:
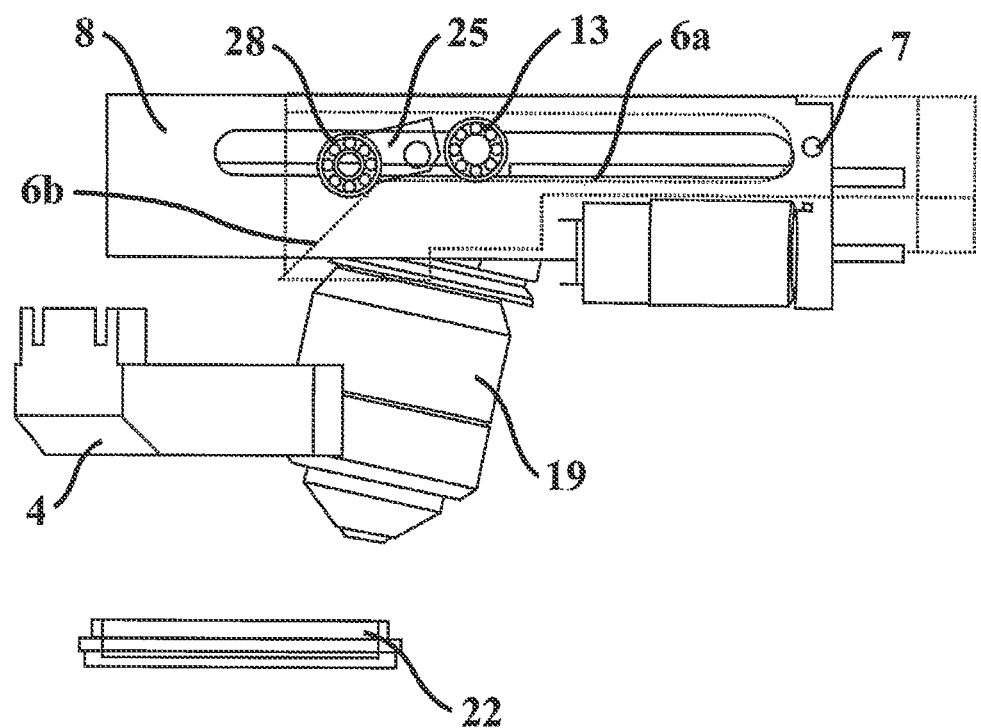
FIG. 13 is an illustration similar to the one of FIG. 9, now with the embodiment of an objective changer according to FIG. 11 before reaching the operating position.
Figure 14:
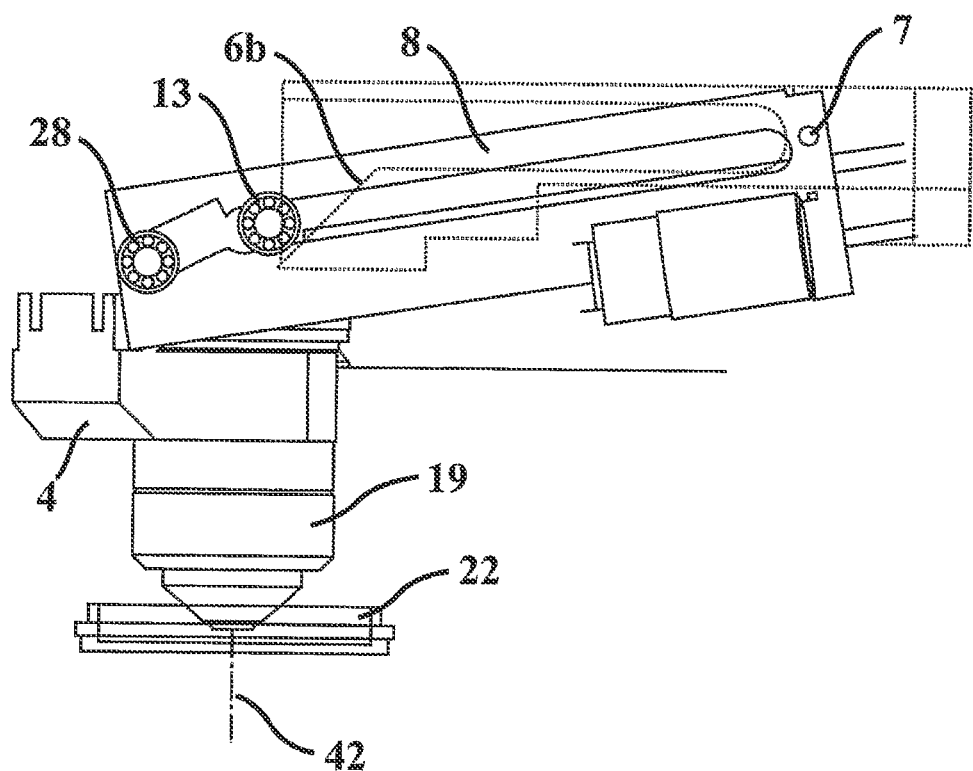
FIG. 14 is an illustration like FIG. 13, in which the operating position of the objective is now reached.

The displacement of the objective 19 from the first portion 6a of the displacement path into the second portion 6b is schematically illustrated in FIGS. 13 and 14. As long as the front bearing 28 is located in the first portion 6a, the existing highly inclined position of the objective 19 remains unchanged. This inclination can in particular be higher than the one achieved by the spring arrangement according to FIG. 6 in order to be able to use other, in particular higher cups than the usually used Petri dishes. As soon as the front bearing 28 enters the second portion 6b of the displacement path (see FIG. 13), the lever 25 is tilted from its horizontal position, as a result whereof the objective-side lever 24 coupled thereto is likewise tilted (downwards) and in this way reduces the inclination (angle of inclination α) of the objective 19. Shortly before the second (rear) bearing 13 reaches the second portion 6b of the displacement path, the angle of inclination α has dropped to a value approximately corresponding to the one which is chosen in the embodiment according to FIG. 6. When the bearing 13 enters the second portion 6b, a lowering of the objective 19 with a further reduction of the angle of inclination α takes place as a result of the downward pivoting of the guide receptacle 8 pivotably mounted in the bearing bore 7. In FIG. 14, the final position is shown in which the longitudinal axis of the objective 19 coincides with the optical axis 42 so that the objective 19 has reached its operating position.

Figure 15:
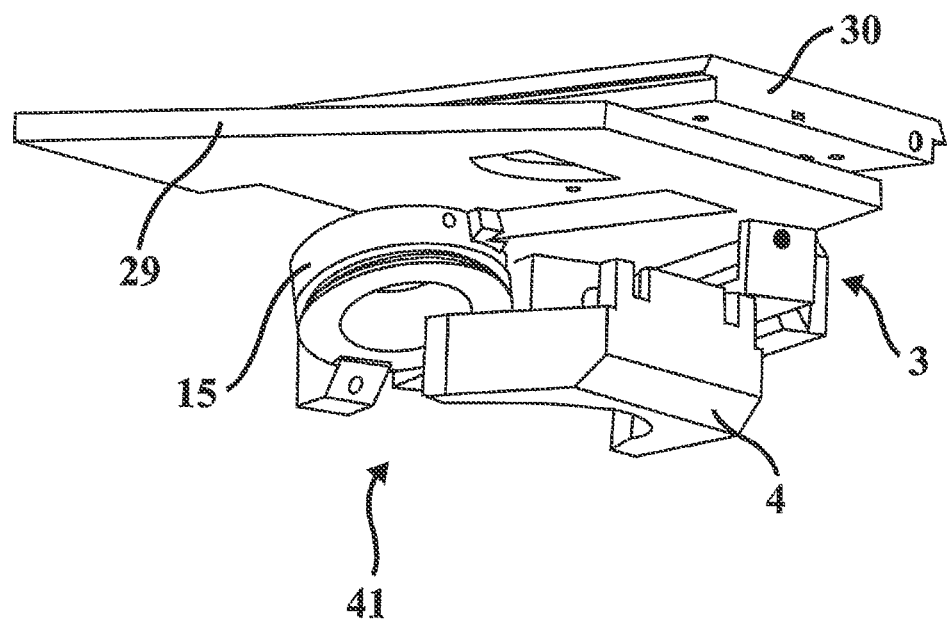
FIG. 15 shows an embodiment of an inventive objective changer having a modular design.

Finally, with reference to FIG. 15, a possible modular structure of an objective changer is explained. Here, the adjusting units 3 of each objective 19 are not mounted on the support element 2 of a microscope 1 (see FIGS. 1 and 2) but on an intermediate plate 29. This intermediate plate 29 has on its upper side a dovetail 30 which can be inserted into a corresponding counter receptacle on the support element 2 of the microscope 1. Thus, the intermediate plate 29 together with the corresponding connecting piece (here dovetail 30) and the changing device 41 mounted on the intermediate plate forms a module which, as needed, can easily be inserted into an existing microscope 1. In the example illustrated in FIG. 15, the centering mount 4 is fixed to the intermediate plate 29. It can, however, also be useful to directly connect the centering mount 4 to the support element 2 of the microscope 1 (as in the embodiments according to FIGS. 1 and 2).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE NUMBERS

| | |
|---|---|
| 1 | microscope |
| 2 | support element |
| 3, 3a, 3b | adjusting unit |
| 4 | centering mount |
| 5 | carrier |
| 6a | first (horizontal) portion |
| 6b | second (angled) portion |
| 7 | bearing bore |
| 8 | guide receptacle |
| 9a, 9b | guide rod |
| 10 | carriage |
| 10a | support arm |
| 10b | point of support |
| 11 | threaded spindle drive, drive |
| 11b | threaded spindle |
| 12 | slot |

-continued

| | |
|---|---|
| 13 | (ball) bearing |
| 14 | bolt |
| 15 | objective holder |
| 16 | spring |
| 17 | stop |
| 18 | thread |
| 19 | objective |
| 20 | groove |
| 21 | beveled side |
| 22 | dish-shaped container |
| 23 | axis |
| 24 | objective-side lever |
| 25 | lever |
| 26 | pin |
| 27 | bolt |
| 28 | (ball) bearing |
| 29 | intermediate plate |
| 30 | dovetail |
| 31 | bottom surface objective holder |
| 32 | surface centering mount |
| 33 | counter bearing |
| 34 | stage holder |
| 41 | changing device |
| 42 | optical axis |
| α | angle of inclination |

The invention claimed is:

1. A microscope objective changer comprising:
a changing device for changing at least two objectives;
a movable objective holder corresponding to each objective, each movable objective holder being configured to receive a respective one of the objectives and to transfer the respective objective along a respective displacement path from an allocated stand-by position into an operating position, the operating position defining an optical axis, the respective displacement paths being different from one another;
a carrier associated with each objective holder and including a guide groove constituting the respective displacement path, each displacement path including a first portion beginning at the respective stand-by position and extending substantially perpendicular to the optical axis and a second portion directly bordering the first portion and including a downwardly component in a direction parallel to the optical axis such that each objective holder is movable from the respective stand-by position to the optical axis of the operating position when reaching a lower end of the second portion of the displacement path; and
a drivable carriage associated with each objective, each drivable carriage having an associated objective holder, on which the objective holder is mountable, wherein the objective holder is arranged pivotably on the drivable carriage and is connected to the drivable carriage via at least one of a biasing device or a lever mechanism by which the center axis of the objective holder can be held under an angle of inclination (α) relative to the optical axis at least in the first portion of the displacement path.

2. The objective changer recited in claim 1, wherein the first portions of the displacement paths lie in one common plane and extend in at least one of a straight line or a curved manner.

3. The objective changer recited in claim 2, wherein each two adjacent straight displacement paths are arranged in a V-shape.

4. The objective changer recited in claim 1, wherein the different displacement paths, along which the objective holders are movable, are arranged in the changing device such that all objectives present in the objective holders can simultaneously reach a respective parking position, in particular their allocated stand-by position.

5. The objective changer recited in claim 1, further comprising an adjusting unit corresponding to each objective, each adjusting unit including a respective one of the drivable carriages.

6. The objective changer recited in claim 5, wherein each drivable carriage is moveable along at least one guide rod.

7. The objective changer recited in claim 5, wherein each drivable carriage is moveable along a corresponding guide groove provided in each adjusting unit.

8. The objective changer recited in claim 7, further comprising a coupling for coupling each carriage and each corresponding guide receptacle to the corresponding guide groove in the corresponding carrier.

9. The objective changer recited in claim 6, wherein each carriage is connected to a guide receptacle of the corresponding adjusting unit via the at least one guide rod.

10. The objective changer recited in claim 5, wherein the changing device is connected to an intermediate plate.

11. The objective changer recited in claim 10, wherein on the intermediate plate a centering mount for the space-fixed positioning of an objective holder is arranged.

12. The objective changer recited in claim 5, further comprising a drive at the adjusting unit for each carriage.

13. The objective changer recited in claim 1, wherein by means of the biasing device or the lever mechanism the center axis of the objective holder is fixable in the second portion of the displacement path under a smaller angle of inclination relative to the optical axis than the angle in the first portion.

14. A microscope having an objective changer comprising:
a changing device for changing at least two objectives;
a movable objective holder corresponding to each objective, each movable objective holder being configured to receive a respective one of the objectives and to transfer the respective objective along a respective displacement path from an allocated stand-by position into an operating position, the operating position defining an optical axis, the respective displacement paths being different from one another;
a carrier associated with each objective holder and including a guide groove constituting the respective displacement path, each displacement path including a first portion beginning at the respective stand-by position and extending substantially perpendicular to the optical axis and a second portion directly bordering the first portion and including a downwardly component in a direction parallel to the optical axis such that each objective holder is movable from the respective stand-by position to the optical axis of the operating position when reaching a lower end of the second portion of the displacement path; and
a drivable carriage associated with each objective, each drivable carriage having an associated objective holder, on which the objective holder is mountable, wherein the objective holder is arranged pivotably on the drivable carriage and is connected to the drivable carriage via at least one of a biasing device or a lever mechanism by which the center axis of the objective holder can be held under an angle of inclination (α) relative to the optical axis at least in the first portion of the displacement path.

15. The microscope recited in claim 14, wherein the microscope has a support element which is adjustable in focusing direction, on which support element the changing device of the objective changer is mounted.

16. The microscope recited in claim 15, wherein on the support element a centering mount for the space-fixed positioning of an objective holder is arranged.

17. The microscope recited in claim 14 wherein the changing device is connected to an intermediate plate, and the intermediate plate is connectable to a support element of the microscope, which support element is adjustable in focusing direction.

* * * * *